US012647058B2

(12) United States Patent
Hossain et al.

(10) Patent No.: US 12,647,058 B2
(45) Date of Patent: Jun. 2, 2026

(54) SYSTEM AND METHOD FOR SURFACE-MOUNTED PERMANENT MAGNET MOTOR CONTROL USING PEAK TORQUE

(71) Applicant: Steering Solutions IP Holding Corporation, Saginaw, MI (US)

(72) Inventors: Md Abid Hossain, Saginaw, MI (US); Thomas J. Stutts, Linwood, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 255 days.

(21) Appl. No.: 18/617,170

(22) Filed: Mar. 26, 2024

(65) Prior Publication Data

US 2025/0309806 A1     Oct. 2, 2025

(51) Int. Cl.
| | |
|---|---|
| *H02P 21/18* | (2016.01) |
| *H02P 21/20* | (2016.01) |
| *H02P 27/06* | (2006.01) |

(52) U.S. Cl.
CPC .............. *H02P 21/20* (2016.02); *H02P 27/06* (2013.01)

(58) Field of Classification Search
CPC ........... H02P 21/20; H02P 27/06; H02P 21/22
See application file for complete search history.

(56) References Cited

U.S. PATENT DOCUMENTS

| | | | |
|---|---|---|---|
| 9,531,311 | B2 | 12/2016 | Collier-Hallman |
| 10,530,282 | B2 | 1/2020 | Pramod et al. |
| 2022/0190760 | A1* | 6/2022 | Tseng ...................... H02P 21/18 |

* cited by examiner

*Primary Examiner* — Muhammad S Islam
(74) *Attorney, Agent, or Firm* — Dickinson Wright PLLC

(57) ABSTRACT

Technical solutions are described for controlling a surface-mounted permanent magnet (SPM) motor. A method for controlling a surface-mounted permanent magnet (SPM) motor includes: determining a peak torque value; determining a limited torque command based on a torque command and which does not exceed the peak torque value; determining, based on the limited torque command, a voltage command; and commanding, based on the voltage command, an inverter to apply an output voltage to the SPM motor. Determining the peak torque value includes: determining a voltage angle of the output voltage relative to a q-axis; and calculating the peak torque value based on the voltage angle of the output voltage and based on an available voltage to an input of the inverter.

20 Claims, 8 Drawing Sheets

400

402 DETERMINE A PEAK TORQUE VALUE

402A DETERMINE A VOLTAGE ANGLE OF THE OUTPUT VOLTAGE RELATIVE TO A Q-AXIS

402B CALCULATE THE PEAK TORQUE VALUE BASED ON THE VOLTAGE ANGLE OF THE OUTPUT VOLTAGE AND BASED ON AN AVAILABLE VOLTAGE TO AN INPUT OF THE INVERTER

404 DETERMINE A LIMITED TORQUE COMMAND BASED ON A TORQUE COMMAND AND WHICH DOES NOT EXCEED THE PEAK TORQUE VALUE

406 DETERMINE, BASED ON THE LIMITED TORQUE COMMAND, A VOLTAGE COMMAND

406A DETERMINE A CURRENT COMMAND BASED ON THE VOLTAGE ANGLE OF THE OUTPUT VOLTAGE AND BASED ON AN AVAILABLE VOLTAGE TO THE INPUT OF THE INVERTER

406B DETERMINE THE VOLTAGE COMMAND BASED ON THE CURRENT COMMAND

408 COMMAND, BASED ON THE VOLTAGE COMMAND, AN INVERTER TO APPLY AN OUTPUT VOLTAGE TO THE SPM MOTOR

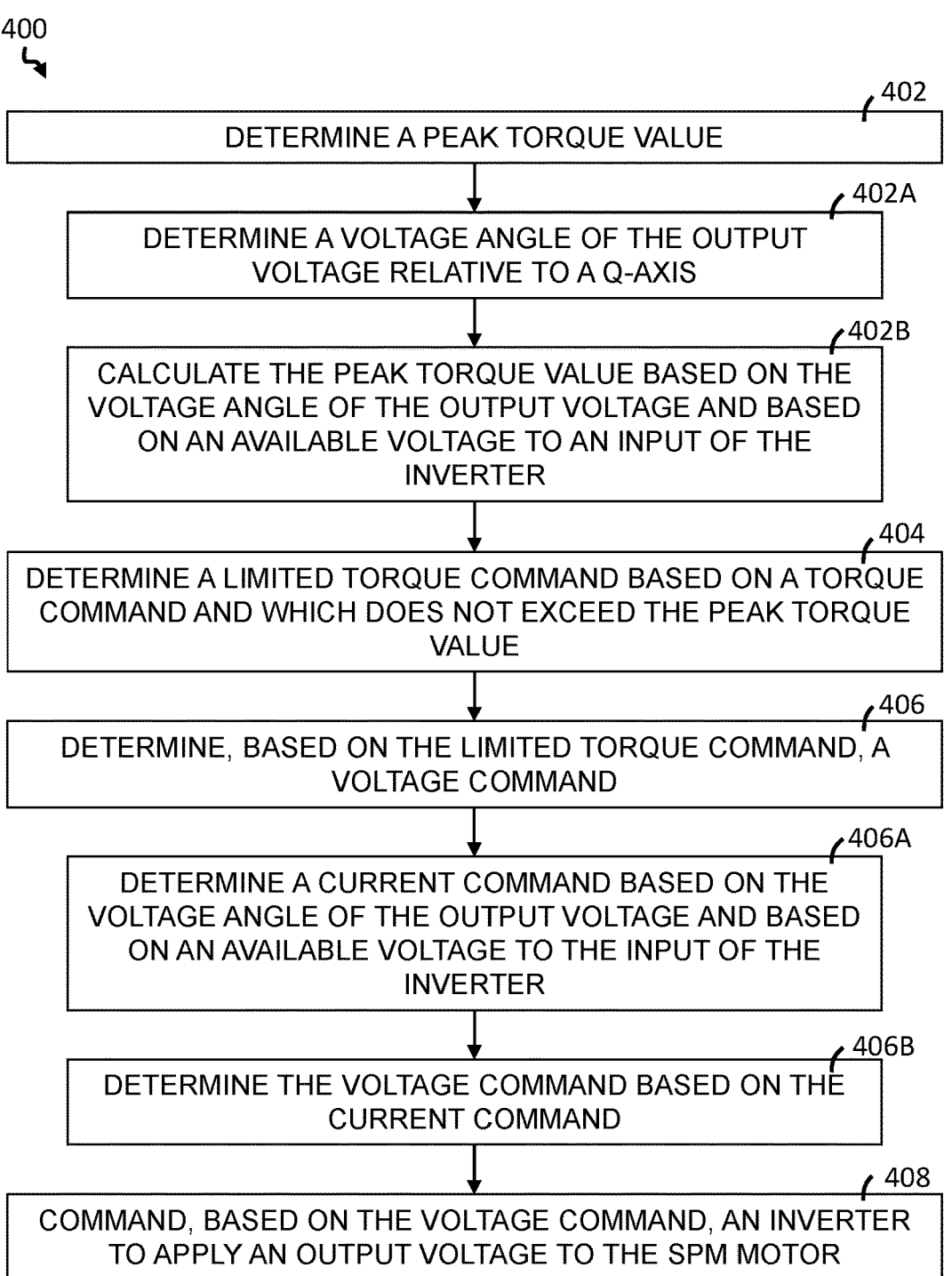

400

402
DETERMINE A PEAK TORQUE VALUE

402A
DETERMINE A VOLTAGE ANGLE OF THE OUTPUT VOLTAGE RELATIVE TO A Q-AXIS

402B
CALCULATE THE PEAK TORQUE VALUE BASED ON THE VOLTAGE ANGLE OF THE OUTPUT VOLTAGE AND BASED ON AN AVAILABLE VOLTAGE TO AN INPUT OF THE INVERTER

404
DETERMINE A LIMITED TORQUE COMMAND BASED ON A TORQUE COMMAND AND WHICH DOES NOT EXCEED THE PEAK TORQUE VALUE

406
DETERMINE, BASED ON THE LIMITED TORQUE COMMAND, A VOLTAGE COMMAND

406A
DETERMINE A CURRENT COMMAND BASED ON THE VOLTAGE ANGLE OF THE OUTPUT VOLTAGE AND BASED ON AN AVAILABLE VOLTAGE TO THE INPUT OF THE INVERTER

406B
DETERMINE THE VOLTAGE COMMAND BASED ON THE CURRENT COMMAND

408
COMMAND, BASED ON THE VOLTAGE COMMAND, AN INVERTER TO APPLY AN OUTPUT VOLTAGE TO THE SPM MOTOR

FIG. 10

SYSTEM AND METHOD FOR SURFACE-MOUNTED PERMANENT MAGNET MOTOR CONTROL USING PEAK TORQUE

BACKGROUND

Permanent magnet synchronous machines (PMSM) commonly used in a variety of applications including Electric Power Steering (EPS) systems. These PMSM motors provide the highest efficiency, less torque ripples, less noise, high torque density, and better performance.

There are two main types of PMSM: Surface-mounted PMSM (SPMSM or SPM) and interior-mounted PMSM (IPMSM or IPM). Existing control algorithms are generally applicable to both SPM and IPM motor types. However, SPM motors are becoming more for many different applications. The control algorithm can be simplified for SPM. Existing control techniques may use iteration methods to determine the maximum achievable torque and the corresponding maximum field weakening current. The iteration method enables the algorithm to be applied to IPM motor types. However, including the iteration method adds significant computation time, resulting in higher processor loads. With increasing cost pressures, reduction of microprocessor load is an important consideration.

SUMMARY

According to one or more embodiments, a method for controlling a surface-mounted permanent magnet (SPM) motor is provided. The method includes: determining a peak torque value; determining a limited torque command based on a torque command and which does not exceed the peak torque value; determining, based on the limited torque command, a voltage command; and commanding, based on the voltage command, an inverter to apply an output voltage to the SPM motor. Determining the peak torque value includes: determining a voltage angle of the output voltage relative to a q-axis; and calculating the peak torque value based on the voltage angle of the output voltage and based on an available voltage to an input of the inverter.

According to one or more embodiments, an electronic controller includes: a processor; and a memory that includes instructions. The instructions, when executed by the processor, cause the processor to: determine, a peak torque value; determine a limited torque command based on a torque command and which does not exceed the peak torque value; determine, based on the limited torque command, a voltage command; and command, based on the voltage command, an inverter to apply an output voltage to a surface-mounted permanent magnet (SPM) motor. Determining the peak torque value includes: determining a voltage angle of the output voltage relative to a q-axis; and calculating the peak torque value based on the voltage angle of the output voltage and based on an available voltage to an input of the inverter.

According to one or more embodiments, a motor control system includes: a surface-mounted permanent magnet (SPM) motor; an inverter configured to supply an alternating current (AC) power to the SPM motor; and a controller. The controller is configured to: determine, a peak torque value; determine a limited torque command based on a torque command and which does not exceed the peak torque value; determine, based on the limited torque command, a voltage command; and command, based on the voltage command, the inverter to apply an output voltage to the SPM motor. Determining the peak torque value includes: determining a voltage angle of the output voltage relative to a q-axis; and calculating the peak torque value based on the voltage angle of the output voltage and based on an available voltage to an input of the inverter.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 10 is a flow diagram generally illustrating a method for controlling a surface-mounted permanent magnet (SPM) motor, according to the principles of the present disclosure

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present disclosure provides a system and method for controlling SPM motors. The system and method of the present disclosure does not require any iteration, thereby making the process more robust, quick, and able to run at a faster sampling rate compared to conventional motor control systems and methods. The system and method of the present disclosure is more dynamic and avoids common issues with conventional motor controllers, such as being unable to converge to a solution due to initial guesses and setting up parameters. The system and method of the present disclosure provides several improvements over conventional devices and methods, reducing many variables and parameters defined at various stages. The system and method of the present disclosure may thereby simplify or eliminate several different calculations required by conventional motor controllers. Thus, the system and method of the present disclosure may enable use of a less costly processor or using a same processor for additional functionality.

Figure 1:
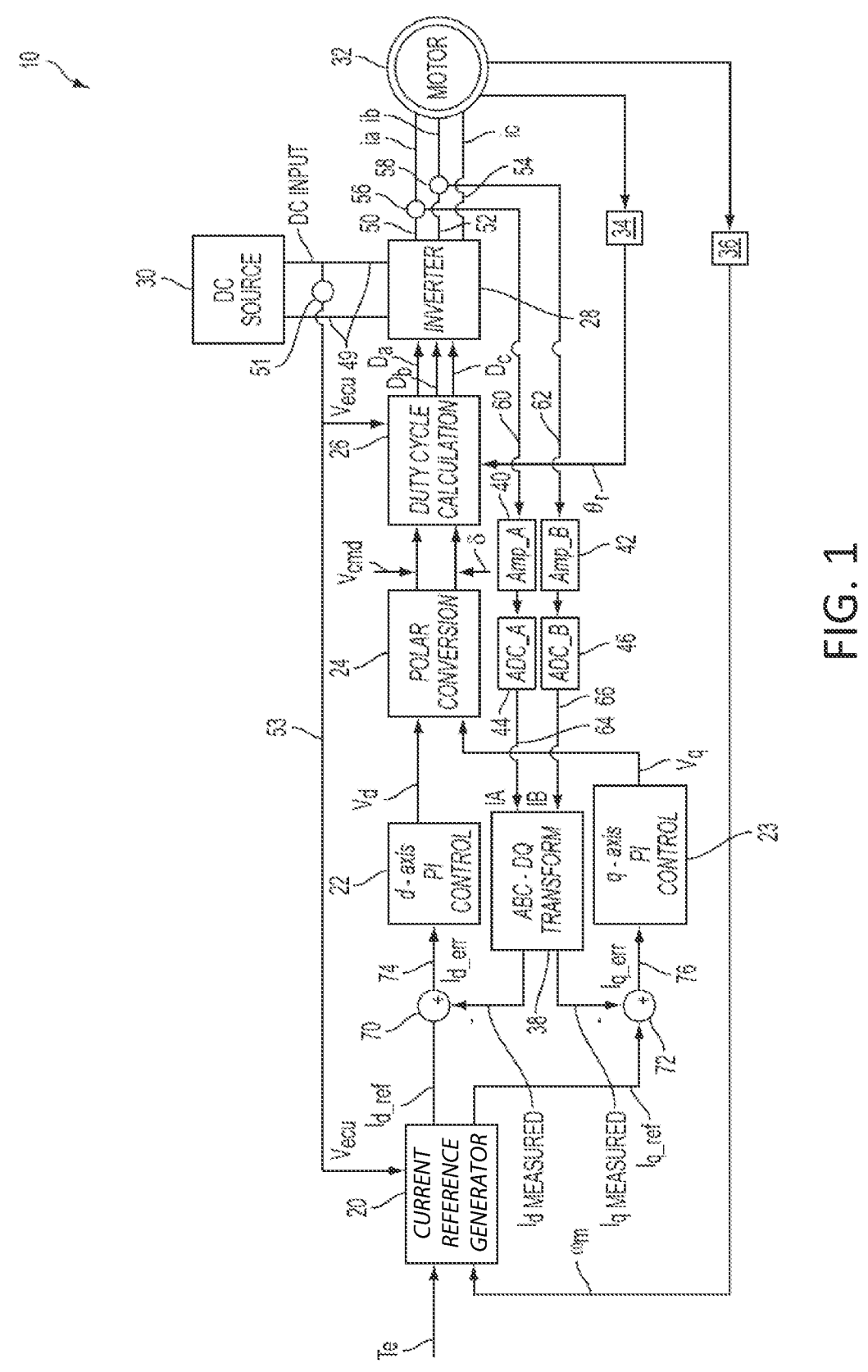
FIG. 1 depicts a block diagram of a motor control system, according to aspects of the present disclosure.

Referring now to the Figures, where the invention will be described with reference to specific embodiments, without limiting same, FIG. 1 shows an exemplary block diagram of a motor control system 10. The motor control system 10 includes a current reference generator 20, a d-axis proportional plus integral gain (PI) controller 22, a q-axis PI controller 23, a polar conversion controller 24, a pulse width modulation (PWM) inverter controller 26, an inverter 28, a DC power source 30, a SPM motor 32, a position sensor 34, a speed sensor 36, a transform controller 38, an a-phase current amplifier 40, a b-phase current amplifier 42, an a-phase analog to digital converter (ADC) 44, and a b-phase ADC 46. The SPM motor 32 may be controlled in a current mode of control or a voltage mode of control. The motor control system 10 may be part of an electronic power steering system (not depicted). The SPM motor 32 may be configured to provide a steering assist toque based on a torque command.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the current reference generator 20 and the PWM inverter controller 26. In the exemplary embodiment as shown, the inverter 26 transmits three alternating current (AC) phase currents to the SPM motor 32 (e.g., $i_a$, $i_b$, and $i_c$) by line 50, line 52, and line 54 for operation and control of the SPM motor 32. The bridge voltage $V_{ecu}$ may represent a maximum voltage available for use in controlling the SPM motor 32. Alternatively, the maximum voltage can be a percentage of the bridge voltage $V_{ecu}$, such as 90% or 95% of the bridge voltage $V_{ecu}$.

For feedback control purposes, the phase currents $i_a$ and is transmitted to the SPM motor 32 by lines 50 and 52 may be detected to determine the instantaneous current flow to the SPM motor 32. Specifically, a first current sensor 56 may be used to monitor the a-phase current $i_a$ on the line 50, and a second current sensor 58 may be used to monitor the b-phase current $i_b$ on the line 52. It should be noted that although two of the current sensors 56, 58 are illustrated, only one of the lines 50 or 52 may be monitored to measure either a-phase current $i_a$ or b-phase current $i_b$. A first control signal 60 representing the measured a-phase current $i_a$ may be sent to the a-phase current amplifier 40 from the transducer 56, and a second control signal 62 representing the measured b-phase current it may be sent to the b-phase current amplifier 42 from the transducer 58. An augmented or amplified value of the a-phase current $i_a$ is then sent to the a-phase ADC 44 from the a-phase current amplifier 40, and an amplified value of the b-phase current it is sent to the b-phase ADC 46 from the b-phase current amplifier 42. The a-phase ADC 44 converts the amplified value of the a-phase current $i_a$ into a digital value 64. The digital value 64 represent the magnitude of the a-phase current $i_a$. The b-phase ADC 46 converts the amplified value of the b-phase current $i_b$ into a digital value 66. The digital value 66 represents the magnitude of the b-phase current $i_b$.

The transform controller 38 receives, as inputs, the digital value 64 from the a-phase ADC 44 and the digital value 66 from the b-phase ADC 46. In one embodiment, the transform controller 38 is a three-phase to two-phase transformation controller where measured values for the AC current (e.g., the digital value 64 representing the a-phase current $i_a$ and the digital value 66 representing the b-phase current $i_b$) are converted into equivalent measured DC current components, which are a measured d-axis current $I_{dMEASURED}$ and a measured q-axis current $I_{qMEASURED}$. The measured d-axis current $I_{dMEASURED}$ is sent to a first subtractor 70 and the measured q-axis current $I_{qMEASURED}$ is sent to a second subtractor 72.

The current reference generator 20 receives as input a torque command $T_e$, an angular speed $\omega_m$, and the control signal 53 representing the bridge voltage $V_{ecu}$ from the transducer 51. The torque command $T_e$ represents a commanded torque value, and may be derived from another controller (not shown), or may correspond to a torque value generated by an operator. The angular speed Om is measured by the speed sensor 36. The speed sensor 36 may include, for example, an encoder and a speed calculation circuit for calculating the angular speed of a rotor (not shown) of the SPM motor 32 based on a signal received by the encoder. The current reference generator 20 calculates a reference d-axis current $I_{d\_REF}$ and a reference q-axis current $I_{q\_REF}$ based on the torque command $T_e$, the bridge voltage $V_{ecu}$, and the angular speed $\omega_m$, which is described below. The reference d-axis current $I_{d\_REF}$ is sent to the first subtractor 70, and the reference q-axis current $I_{q\_REF}$ is sent to the second subtractor 72.

The first subtractor 70 receives the measured d-axis current $I_{dMEASURED}$ and the reference d-axis current $I_{d\_REF}$. The first subtractor 70 determines a d-axis error signal 74 based on the measured d-axis current $I_{dMEASURED}$ and the reference d-axis current $I_{d\_REF}$. The d-axis error signal 74 represents the error between the measured d-axis current $I_{dMEASURED}$ and the reference d-axis current $I_{d\_REF}$. The second subtractor 72 receives the measured q-axis current $I_{qMEASURED}$ and the reference q-axis current $I_{q\_REF}$. The second subtractor 72 determines a q-axis error signal 76 based on the measured q-axis current $I_{qMEASURED}$ and the reference q-axis current $I_{q\_REF}$. The q-axis error signal 76 represents the error between the measured q-axis current $I_{qMEASURED}$ and the reference q-axis current $I_{q\_REF}$.

The d-axis PI controller 22 receives as input the d-axis error signal 74 from the first subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the second subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle δ. The PWM inverter controller 26 receives as inputs the voltage command $V_{cmd}$ and the phase advance angle δ from the polar conversion controller 24. The PWM inverter controller 26 also receives a rotor angle value $θ_r$ measured by the position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the SPM motor 32.

Figure 2:
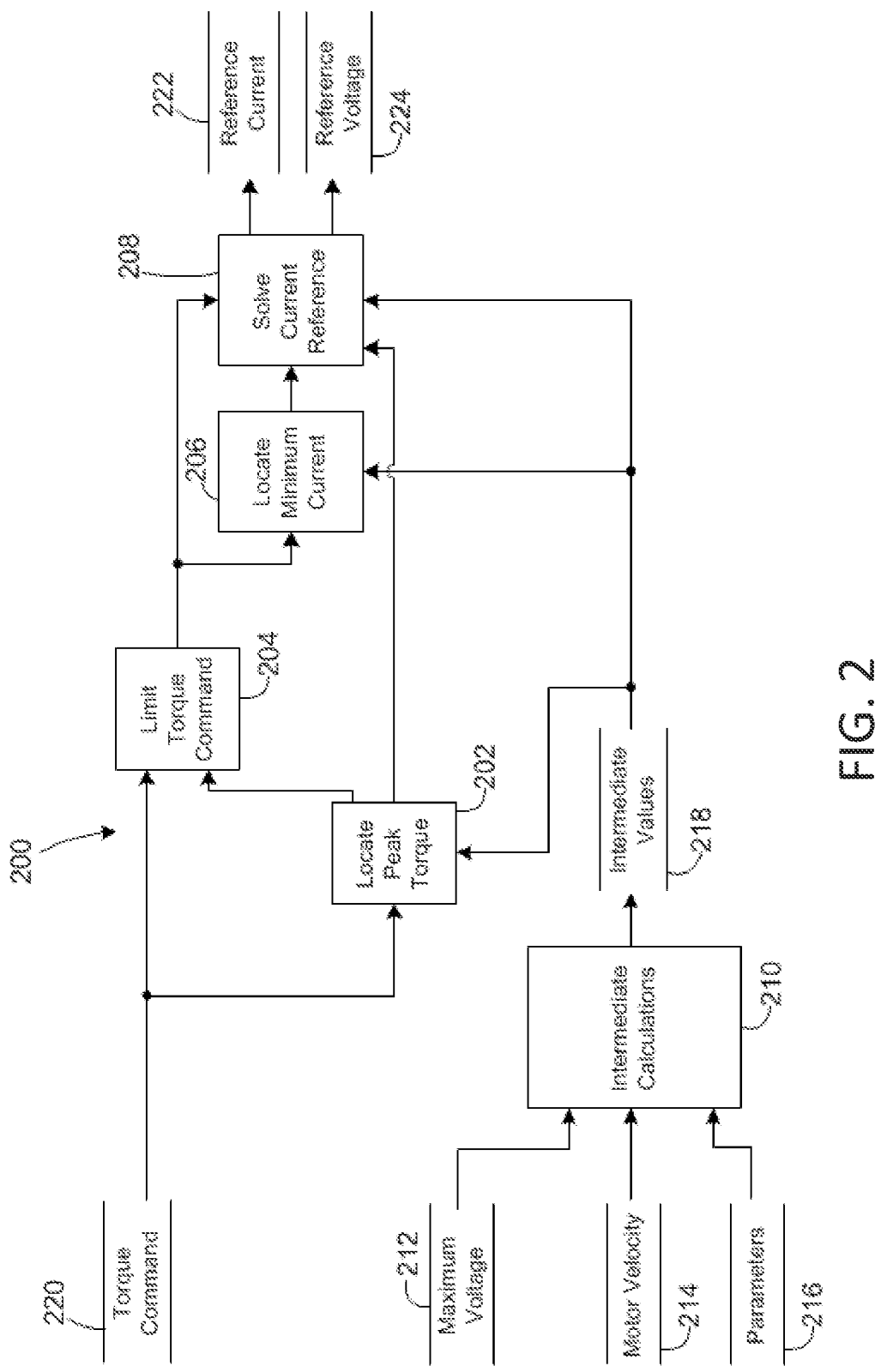
FIG. 2 depicts a block diagram of a current reference generator, according to aspects of the present disclosure.

FIG. 2 is a block diagram of a current reference generator 200 in accordance with an exemplary embodiment of the invention. The current reference generator 200 is an embodiment of the current reference generator 20 of FIG. 1. In an alternate embodiment, the current reference generator 200 is used in a voltage mode system configured to operate based on a voltage reference vector, such as a brushless motor controlled in a voltage mode. As previously described, in voltage controlled motors, a voltage reference vector in polar coordinates is typically generated such that the efficiency is maximized until the magnitude of the voltage approaches the DC input voltage to the controller. After that, the phase angle is changed to obtain the desired torque with the limited voltage. However, motor control systems typically do not support both motors controlled in a voltage mode and in a current mode. In contrast, the current reference generator 200 produces both a current reference vector and voltage reference vector to support either a voltage or current controlled motor.

As can be appreciated, the modules shown in FIG. 2 can be combined and/or further partitioned to similarly generate a current reference vector and a voltage reference vector.

In the example of FIG. 2, the current reference generator 200 includes a locate peak torque module 202, a limit torque command module 204, a locate minimum current module 206, and a solve current reference module 208. The current reference generator 200 may also include an intermediate calculations module 210 that determines a plurality of intermediate values 218 based on a plurality of motor parameters 216, a maximum voltage 212, and a motor velocity 214. The intermediate values 218 can be calculated in one interval and used repeatedly over multiple intervals by the locate peak torque module 202. The intermediate values 218 can also be provided to the locate minimum current module 206 and the solve current reference module 208. The current reference generator 200 also receives a torque command 220 and generates a current reference vector 222 and a voltage reference vector 224.

The maximum voltage 212 can be the bridge voltage $V_{ecu}$ of FIG. 1 or a percentage of the bridge voltage $V_{ecu}$, such as 90% or 95% of the bridge voltage $V_{ecu}$. The motor velocity 214 may be the angular speed Om measured by the speed sensor 36 of FIG. 1, where the SPM motor 32 of FIG. 1 is controlled by the current reference generator 200. The motor parameters 216 may be measured or estimated values for the SPM motor 32 of FIG. 1, including, for example, a motor constant ($K_e$), a motor circuit resistance (R), a direct axis inductance ($L_d$), a quadrature axis inductance ($L_q$), and a number of poles ($N_{poles}$). The torque command 220 may be the torque command $T_e$ of FIG. 1. The current reference vector 222 can include the reference d-axis current $I_{d\_REF}$ and reference q-axis current $I_{q\_REF}$ of FIG. 1. The voltage reference vector 224 can include a reference d-axis voltage $V_{d\_REF}$ and a reference q-axis voltage $V_{q\_REF}$. The current reference vector 222 may be equivalent to the voltage command $V_{cmd}$.

The locate peak torque module 202 determines a maximum possible torque and a direct axis current that corresponds to the maximum possible torque based on the motor parameters 216, the maximum voltage 212, the motor velocity 214, and a sign of the torque command 220. The locate peak torque module 202 may be further configured to rotate a voltage vector in a circle for a finite number of steps, map the voltage vector to a current vector, create a bracket array of torque values based on the current vector, and search the bracket array for the maximum possible torque. The locate peak torque module 202 can be further configured to adjust any of the bracket arrays having an angle of zero to wrap the angle, and perform iterative parabolic interpolation to refine a location of the maximum possible torque.

The limit torque command module 204 limits the torque command 220 to the maximum possible torque. The locate minimum current module 206 determines a value of the direct axis current that results in a minimum motor current. The locate minimum current module 206 may be further configured to perform iterative parabolic interpolation using a direct axis current of zero, a direct axis current equal to the torque command divided by a motor constant, and half of the torque command divided by the motor constant as initial points for the iterative parabolic interpolation.

The solve current reference module 208 generates a reference vector that satisfies the torque command 220 as limited by the direct axis current that corresponds to the maximum possible torque and the direct axis current that results in the minimum motor current. The solve current reference module 208 is further configured to perform a minimum test to set the reference vector to a minimum value based on determining that the direct axis current that results in the minimum motor current satisfies the torque command 220. The solve current reference module 208 is also configured to perform a maximum test to set the reference vector to a maximum value based on determining that the direct axis current that corresponds to the maximum possible torque does not satisfy the torque command 220. An interval bisection search is performed based on determining that minimum test and the maximum test are not met. The solve current reference module 208 is further configured to compute the current reference vector 222 and the voltage reference vector 224. The solve current reference module 208 can be configured to set the current reference vector 222 as the reference vector that satisfies the torque command 220, where the brushless motor is controlled in a current mode. Alternatively, the solve current reference module 208 can be configured to set the voltage reference vector 224 as the reference vector that satisfies the torque command 220, where the brushless motor is controlled in a voltage mode.

Figure 3:
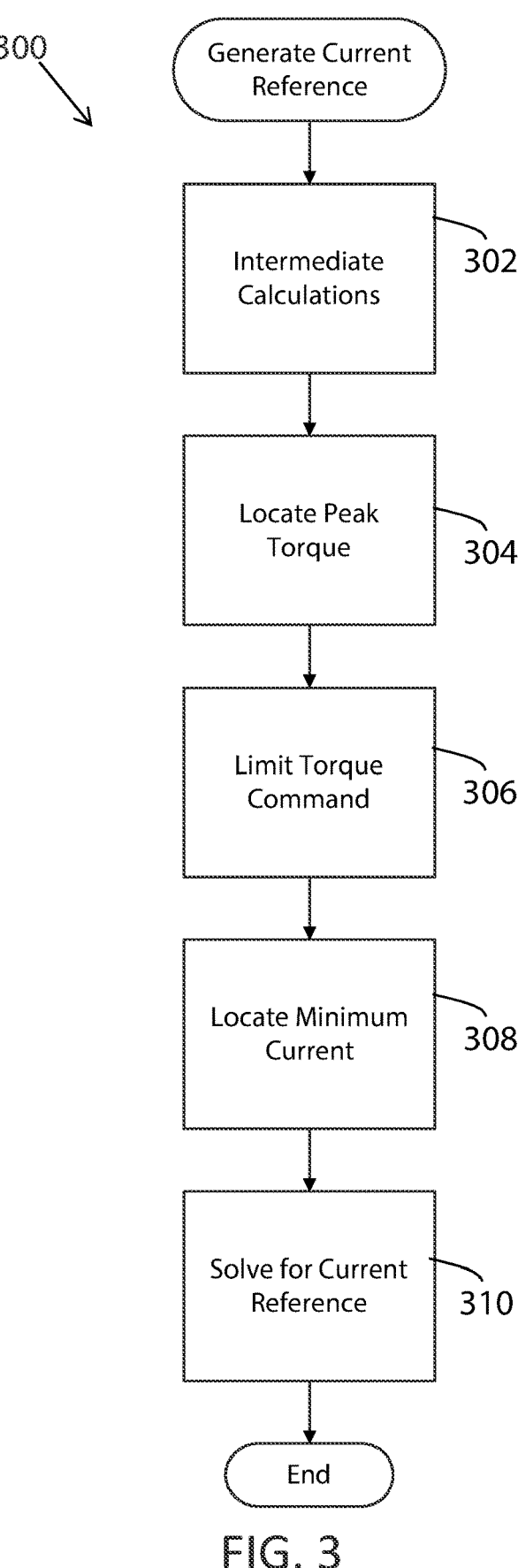
FIG. 3 shows a process flow diagram for generating a reference vector to control a brushless motor in a motor control system, according to aspects of the present disclosure.

FIG. 3 is shows a flow diagram of a process 300 for generating a reference vector to control a SPM motor in a motor control system in accordance with the present disclosure. The process 300 can be performed by the current reference generator 200 of FIG. 2 as an embodiment of the current reference generator 20 of FIG. 1 or other configurations, e.g., in a surface or interior magnet motor control system. Accordingly, FIG. 3 is described in reference to FIGS. 1-3.

At block 302, intermediate calculations can be performed by the intermediate calculations module 210 to determine a plurality of intermediate values 218 based on the motor parameters 216, the maximum voltage 212, and the motor velocity 214, where the intermediate values 218 are calculated in one interval and used repeatedly over multiple intervals.

At block 304, a locate peak torque process performed by the locate peak torque module 202 determines a maximum possible torque and a direct axis current that corresponds to the maximum possible torque based on the motor parameters 216, the maximum voltage 212, the motor velocity 214 of the brushless motor, and a sign of the torque command 220. The intermediate values 218 can be used to provide values associated with the motor parameters 216, the maximum voltage 212, and the motor velocity 214 to the locate peak torque module 202. Further details regarding the locate peak torque process of block 304 are described further herein in reference to FIGS. 4-8.

At block 306, the torque command 220 is limited to the maximum possible torque by the limit torque command module 204.

At block 308, a locate minimum current process performed by the locate minimum current module 206 determines a value of the direct axis current that results in a minimum motor current. Further details regarding the locate minimum current process of block 308 are described further herein in reference to FIG. 9.

At block 310, a solve for current reference process performed by the solve current reference module 208 can generate a reference vector that satisfies the torque command 220 as limited by the direct axis current that corresponds to the maximum possible torque and the direct axis current that results in the minimum motor current.

Figure 4:
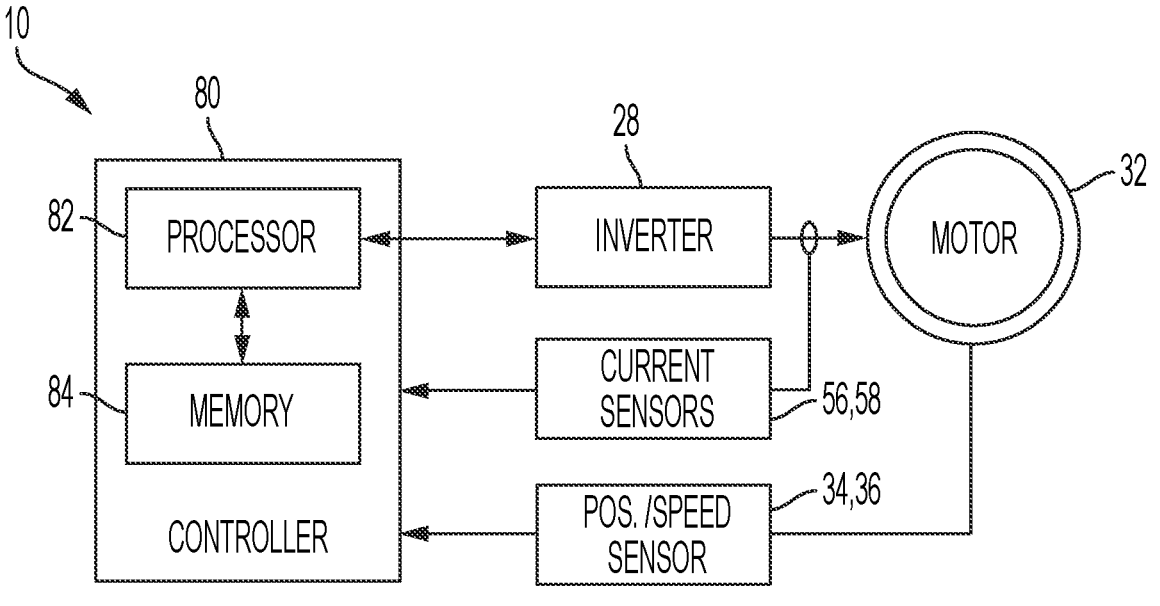
FIG. 4 shows a block diagram showing hardware components of a motor control system, according to aspects of the present disclosure.

FIG. 4 shows a block diagram showing hardware components of the motor control system 10. As shown, the motor control system 10 includes the SPM motor 32 connected to the inverter 28. The inverter 28 is configured to generate and supply AC power to the SPM motor 32. The motor control system 10 also includes current sensors 56, 58 that measure one or more phase currents in corresponding motor leads between the 28 and the SPM motor 32. The motor control system 10 also includes a position and/or speed sensor 34, 36 that measures a rotational position of the SPM motor 32.

The motor control system 10 also includes a controller 80. The controller 80 may include any suitable controller, such as an electronic control unit or other suitable controller. The controller 80 may be configured to control, for example, the various functions of the steering system and/or various functions of a vehicle. The controller 80 may include a processor 82 and a memory 84. The processor 82 may include any suitable processor, such as those described herein. Additionally, or alternatively, the controller 80 may include any suitable number of processors, in addition to or other than the processor 82. The memory 84 may comprise a single disk or a plurality of disks (e.g., hard drives), and includes a storage management module that manages one or more partitions within the memory 84. In some embodiments, memory 84 may include flash memory, semiconductor (solid state) memory or the like. The memory 84 may include Random Access Memory (RAM), a Read-Only Memory (ROM), or a combination thereof. The memory 84 may include instructions that, when executed by the processor 82, cause the processor 82 to, at least, control various aspects of the vehicle. Additionally, or alternatively, the memory 84 may include instructions that, when executed by the processor 82, cause the processor 82 to perform functions associated with the systems and methods described herein.

As shown, the controller 80 is operably connected to the inverter 28 and configured to send one or more commands to cause the inverter 28 to supply the AC power to the SPM motor 32. The controller 80 may receive one or more signals from the current sensors 56, 58, the position sensor 34 and/or the speed sensor 36, the inverter 28 and/or one or more other sensors. The sensors may include any suitable sensors, measurement devices, and/or other suitable mechanisms. For example, the sensors may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 80 may perform the methods described herein. However, the methods described herein as performed by the controller 80 are not meant to be limiting, and any type of software executed on a controller or processor can perform the methods described herein without departing from the scope of this disclosure. For example, a controller, such as a processor executing software within a computing device, can perform the methods described herein.

A SPM motor may be characterized by equation set (1):

$$v_d = \frac{\sqrt{3}}{2}(RI_d + \omega_e LI_q) \tag{1}$$

$$v_q = \frac{\sqrt{3}}{2}(RI_q - \omega_e LI_d) + K_e\omega_m$$

where $v_d$ and $v_q$ are d-axis voltage and q-axis voltages, respectively, $I_d$ and $I_q$ are d-axis current and q-axis current, respectively, R, L, and Ke are resistance, inductance, and back EMF constants of the motor, respectively. $\omega_m$ and $\omega_e$ are mechanical speed and electrical speed of the motor, respectively and are related as equation (2):

$$\omega_e = \frac{n_p\omega_m}{2} \tag{2}$$

where $n_p$ is the number of poles of the motor.

Equation set (1) can be rewritten in matrix form as equation (3):

$$\begin{bmatrix} V_d \\ V_q \end{bmatrix} = \frac{\sqrt{3}}{2}\begin{bmatrix} R & \omega_e L \\ -\omega_e L & R \end{bmatrix}\begin{bmatrix} I_d \\ I_q \end{bmatrix} + \begin{bmatrix} 0 \\ 1 \end{bmatrix}K_e\omega_m \tag{3}$$

Equation (3) can be solved to find the DQ currents, as set forth in equation (4):

$$\begin{bmatrix} I_d \\ I_q \end{bmatrix} = \frac{2}{\sqrt{3}}\frac{1}{R^2 + \omega_e^2 L^2}\left(\begin{bmatrix} R & -\omega_e L \\ \omega_e L & R \end{bmatrix}\begin{bmatrix} V_d \\ V_q \end{bmatrix} + \begin{bmatrix} \omega_e L \\ -R \end{bmatrix}K_e\omega_m\right) \tag{4}$$

During the maximum voltage limit or field weakening condition, DQ voltages can be related to the available supply voltage $V_{Avl}$ as set forth in equation (5):

$$\begin{bmatrix} V_d \\ V_q \end{bmatrix} = V_{Avl} \begin{bmatrix} \sin\delta \\ \cos\delta \end{bmatrix} \tag{5}$$

Here, the available supply voltage $V_{Avl}$ represents a maximum available value for the bridge voltage $V_{ecu}$ at the input of the inverter 28, $\delta$ is the voltage angle, representing an angle of the motor voltage vector with respect to the quadrature-axis.

The torque equation for a SPM can be written as set forth in equation (6):

$$\tau_e = \frac{\sqrt{3}}{2} K_e I_q = \frac{2 K_e}{\sqrt{3}} \frac{V_{Avl}(\cos\delta)R - K_e \omega_m R + \omega_e V_{Avl}(\sin\delta)L}{R^2 + \omega_e^2 L^2} \tag{6}$$

where $\tau_e$ is a torque produced by the SPM.

The maximum torque with respect to the voltage angle $\delta$ can be found using equation (7):

$$\frac{d\tau_e}{d\delta} = 0 \tag{7}$$

Equation (6) is solved for the maximum torque condition, as set forth in equation (8):

$$\delta = \tan^{-1}\left(\frac{\omega_e L}{R}\right) \tag{8}$$

This value for the voltage angle $\delta$ at the maximum torque condition can be used to find the DQ currents using equation (4), as set forth in equation (9):

$$\begin{bmatrix} I_d \\ I_q \end{bmatrix} = \tag{9}$$

$$\frac{2}{\sqrt{3}} \frac{1}{R^2 + \omega_e^2 L^2} \left[ V_{Avl} \begin{bmatrix} R & -\omega_e L \\ \omega_e L & R \end{bmatrix} \begin{bmatrix} \sin\left(\tan^{-1}\left(\frac{\omega_e L}{R}\right)\right) \\ \cos\left(\tan^{-1}\left(\frac{\omega_e L}{R}\right)\right) \end{bmatrix} + \begin{bmatrix} \omega_e L \\ -R \end{bmatrix} K_e \omega_m \right]$$

For a positive value of the torque command $\tau_{cmd}$, the voltage angle $\delta$ should stay within bounds $$-\frac{\pi}{2} \text{ to } \frac{\pi}{2}.$$

However, for a negative value of the torque command $\tau_{cmd}$, the voltage angle $\delta$ changes to between $$-\pi \text{ to } -\frac{\pi}{2} \text{ or } \frac{\pi}{2} \text{ to } \pi.$$

Figure 5:
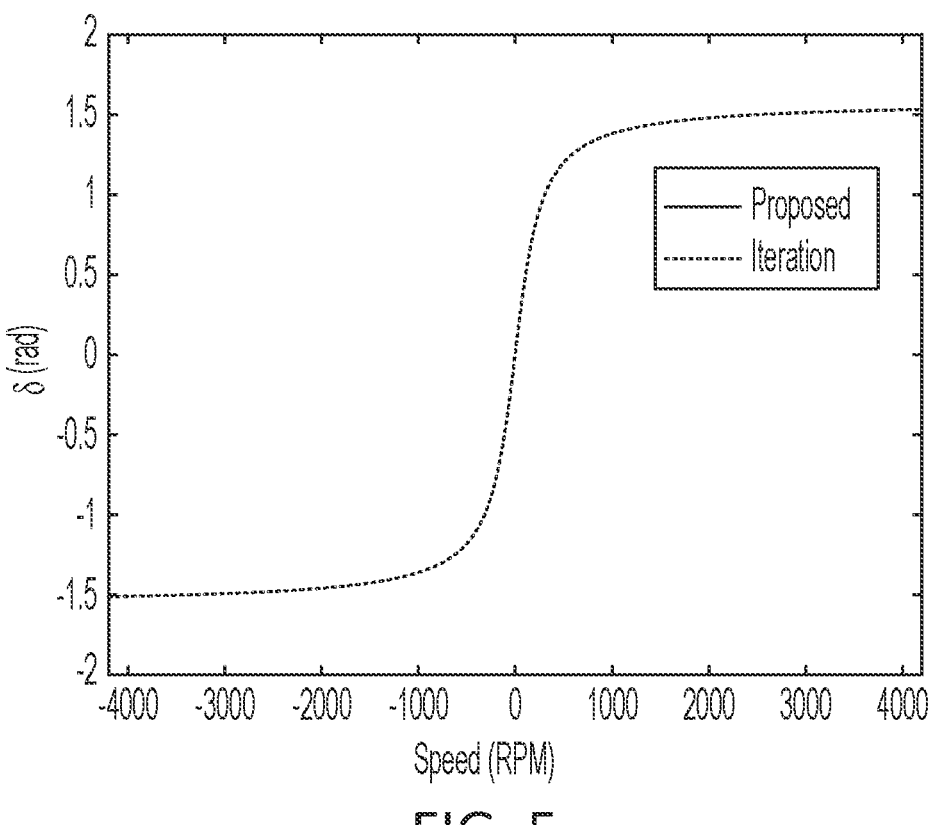
FIG. 5 shows a graph of motor voltage angle for a positive torque command, as a function of speed, and computed using an iterative technique and using a technique of the present disclosure.
Figure 8:
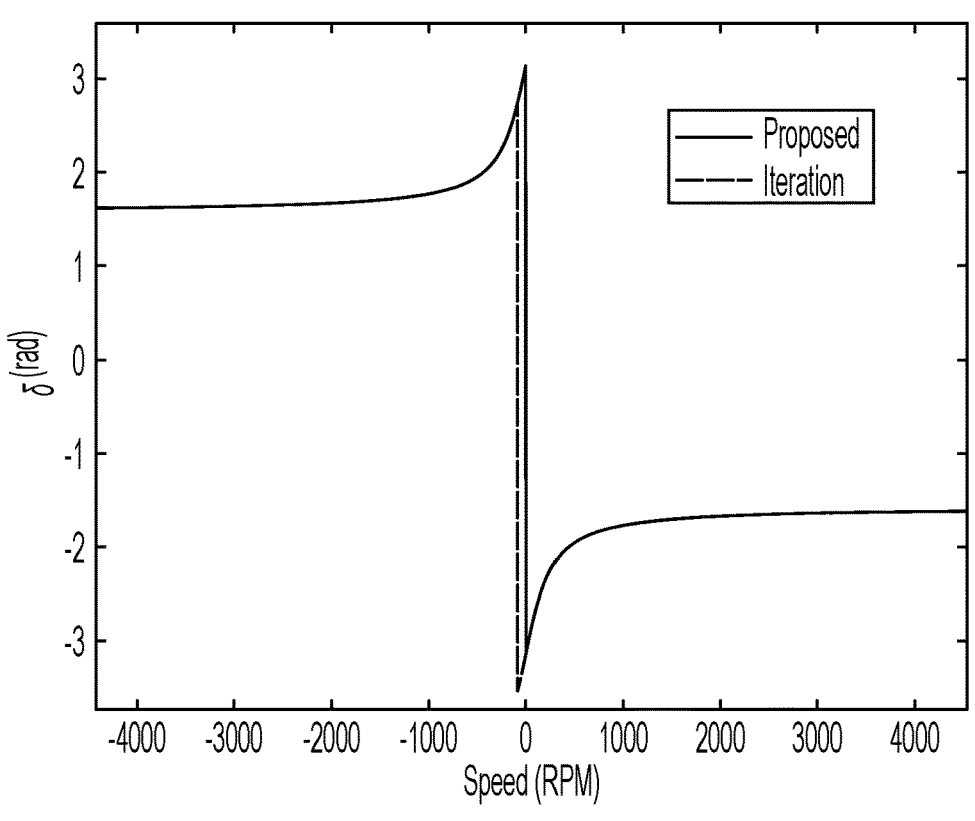
FIG. 8 shows a graph of motor voltage angle for a negative torque command, as a function of speed, and computed using an iterative technique and using a technique of the present disclosure.

These different values of the voltage angle $\delta$ are show in the graphs of FIGS. 5 and 8, respectively. To facilitate this angle range, equations (8) and (9) can be modified as set forth in equations (10) and (11):

$$\delta = \tan^{-1}\left(\frac{\text{sign}(\tau_{cmd})\omega_e L}{\text{sign}(\tau_{cmd})R}\right) \tag{10}$$

$$\begin{bmatrix} I_d \\ I_q \end{bmatrix} = \frac{2}{\sqrt{3}} \frac{1}{R^2 + \omega_e^2 L^2} \left[ V_{Avl} \begin{bmatrix} R & -\omega_e L \\ \omega_e L & R \end{bmatrix} \begin{bmatrix} \sin\left(\tan^{-1}\left(\frac{\text{sign}(\tau_{cmd})\omega_e L}{\text{sign}(\tau_{cmd})R}\right)\right) \\ \cos\left(\tan^{-1}\left(\frac{\text{sign}(\tau_{cmd})\omega_e L}{\text{sign}(\tau_{cmd})R}\right)\right) \end{bmatrix} + \begin{bmatrix} \omega_e L \\ -R \end{bmatrix} K_e \omega_m \right] \tag{11}$$

Equations (10) and (11) each include a sign function, which may also be called a signum function, sign ($T_{cmd}$) to produce a corresponding sign signal (1, 0, or −1) based on the torque command $\tau_{cmd}$ being positive, negative, or zero, respectively.

To implement the proposed solution, it should be noted that the inverse tangent function ($\tan^{-1}$) must produce results in all four quadrants.

Figure 6:
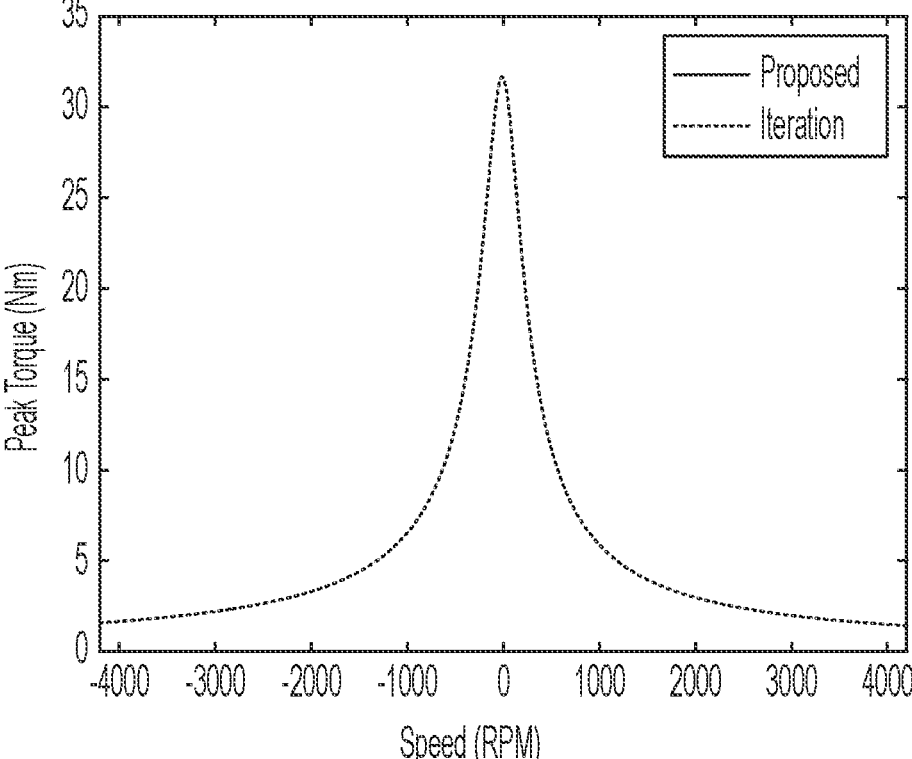
FIG. 6 shows a graph of peak torque for a positive torque command, as a function of speed, and computed using an iterative technique and using a technique of the present disclosure.

FIG. 5 shows a graph of voltage angle $\delta$ for a positive torque command, as a function of speed, and computed using an iterative technique and using a technique of the present disclosure. FIG. 6 shows a graph of peak torque for a positive torque command, as a function of speed, and computed using an iterative technique and using a technique of the present disclosure. As shown, there is almost perfect alignment between the plots of FIGS. 5-6 illustrating the two different techniques. As mentioned, and as shown on FIG. 5, the voltage angle $\delta$ changes between $$-\frac{\pi}{2} \text{ to } \frac{\pi}{2}$$

for a positive torque command. For that range of the voltage angle $\delta$, the peak torque is calculated in a positive direction.

Figure 7A:
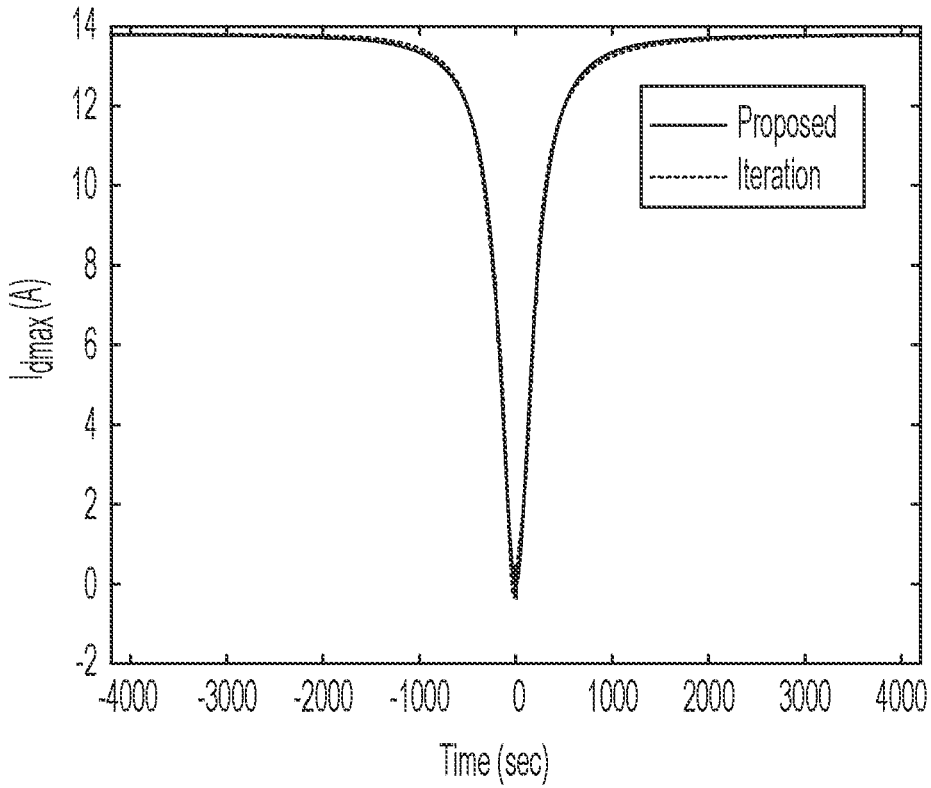
FIGS. 7A-7B each show a graph of maximum d-axis current over a period of time, and computed using an iterative technique and using a technique of the present disclosure.
Figure 7B:
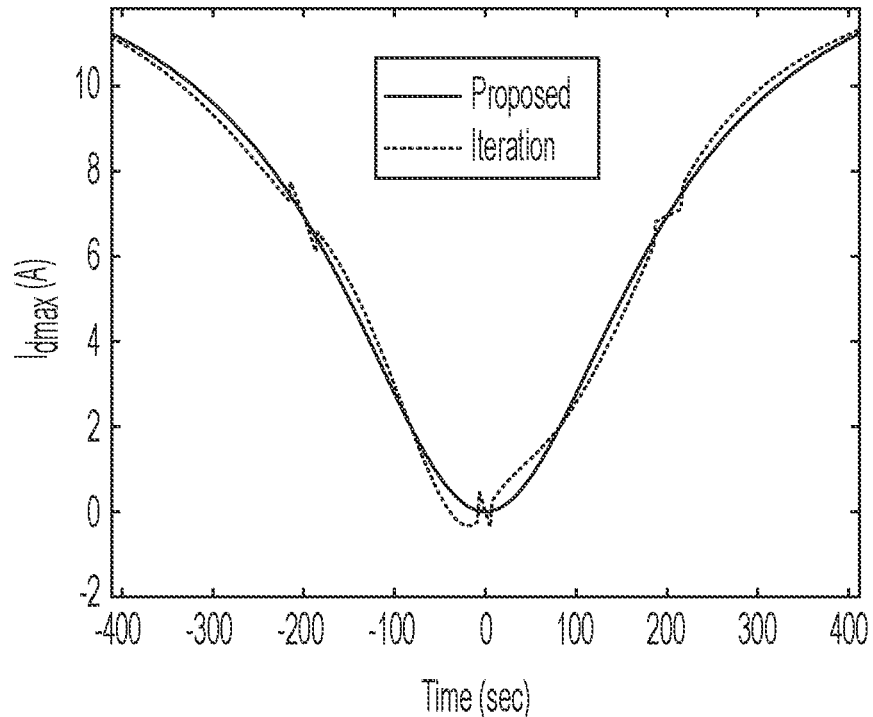

FIGS. 7A-7B each show a graph of maximum d-axis current over a period of time, and computed using an iterative technique and using a technique of the present disclosure. FIG. 7B shows an enlarged section of FIG. 7A. FIGS. 7A-7B show slight differences between results obtained using the an iterative technique and using a technique of the present disclosure. FIG. 7B reveals that the conventional iterative technique cannot properly reach a solution for d-axis current $I_d$=0. On the other hand, the proposed method provides results that are symmetric about $I_d$=0, and without any converse to solution issues. FIG. 7B also shows the maximum d-axis current computed using the conventional iterative technique with several abrupt changes at about times −200s, 0s, and 200s. These abrupt changes correspond to resetting of the output value based on bounds of the iterative technique and are not present in the d-axis current that is computed using the technique of the present disclosure. This demonstrates that the technique of the present disclosure is more dynamic, robust, and better performing.

Figure 9:
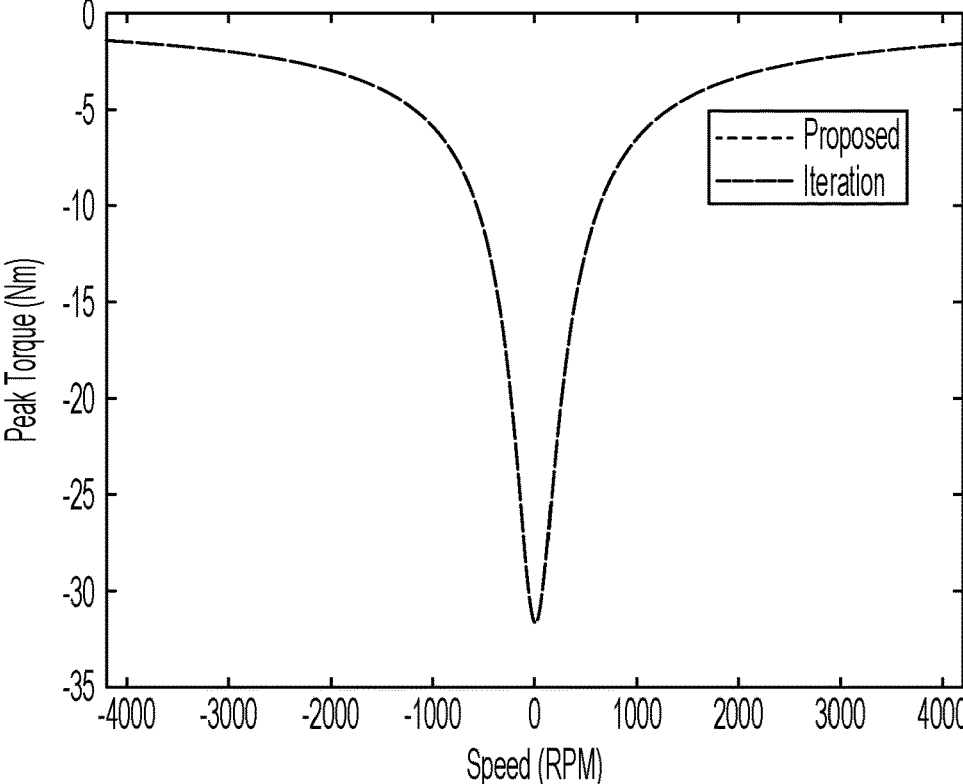
FIG. 9 shows a graph of peak torque for a negative torque command, as a function of speed, and computed using an iterative technique and using a technique of the present disclosure.

FIG. 8 shows a graph of voltage angle δ for a negative torque command, as a function of speed, and computed using an iterative technique and using a technique of the present disclosure. FIG. 9 shows a graph of peak torque for a negative torque command, as a function of speed, and computed using an iterative technique and using a technique of the present disclosure. As shown, there is almost perfect alignment between the plots of FIG. 9 illustrating the two different techniques. However, there is some difference in the plots of FIG. 8 around the discontinuity at the speed of zero (0) RPM. As mentioned, and as shown on FIG. 8, the voltage angle δ changes between to between $$-\pi \text{ to } -\frac{\pi}{2} \text{ or } \frac{\pi}{2}$$

for a negative torque command. More specifically, and as shown on FIG. 8, the voltage angle δ is between $$\frac{\pi}{2} \text{ to } \pi$$

for positive speeds and with the negative torque command. The voltage angle δ is between $$-\pi \text{ to } -\frac{\pi}{2}$$

for negative speeds and with the negative torque command. There is a discontinuity at speed of zero (0), where the voltage angle δ jumps between −π and π. This discontinuity is more accurately performed at precisely the speed of zero (0) RPM using the technique of the present disclosure.

FIG. 10 is a flow diagram generally illustrating a method 400 method for controlling a surface-mounted permanent magnet (SPM) motor. The method 400 can be performed by the motor control system 10 of the present disclosure. As can be appreciated in light of the disclosure, the order of operation within the method is not limited to the sequential execution as illustrated in FIG. 10, but may be performed in one or more varying orders as applicable and in accordance with the present disclosure.

At 402, the method 400 determines a peak torque value. For example, the processor 82 may execute instructions to implement the locate peak torque module 202.

Step 402 includes determining, at 402A, a voltage angle of the output voltage relative to a q-axis. For example, the processor 82 may execute instructions to compute the voltage angle δ. In some embodiments, step 402A may include determining the voltage angle based on an electrical speed, an inductance, and a resistance of the SPM motor. For example, the voltage angle δ may be calculated as set forth in equation (8). In some embodiments, step 402A may include determining the voltage angle further based on a sign of the torque command. For example, the voltage angle δ may be calculated as set forth in equation (10).

Step 402 also includes calculating, at 402B, the peak torque value based on the voltage angle of the output voltage and based on an available voltage to an input of the inverter. The processor 82 may execute instructions to compute the voltage angle δ based on the available voltage $V_{Avl}$ to the input of the inverter 28. For example, the processor 82 may execute instructions to compute the voltage angle δ using a combination of equations (6) and (7).

At 404, the method 400 determines a limited torque command based on a torque command and which does not exceed the peak torque value. For example, the processor 82 may execute instructions to implement the limit torque command module 204.

At 406, the method 400 determines, based on the limited torque command, a voltage command. For example, the processor 82 may execute instructions to implement the locate minimum current module 206 and the solve current reference module 208 to determine the voltage reference vector 224. In some embodiments, the locate minimum current module 206 may include the d-axis PI controller 22, the q-axis PI controller 23, and the polar conversion controller 24 to determine the voltage command $V_{cmd}$.

In some embodiments, step 406 further includes determining, at 406A, a current command based on the voltage angle of the output voltage and based on an available voltage to the input of the inverter. For example, the processor 82 may execute instructions to implement the current reference generator 20 to determine the current command $I_{d\_ref}$, $I_{q\_ref}$. In some embodiments, step 406A may determine the current command using equation (9). Alternatively or additionally, step 406A may determine the current command using equation (11).

In some embodiments, step 406 also includes determining, at 406B, the voltage command based on the current command. For example, the processor 82 may execute instructions to implement the d-axis PI controller 22, the q-axis PI controller 23, and the polar conversion controller 24 to determine the voltage command $V_{cmd}$ based on the current command $I_{d\_ref}$, $I_{q\_ref}$.

At 408, the method 400 commands, based on the voltage command, an inverter to apply an output voltage to the SPM motor. For example, the processor 82 may execute instructions command the inverter 28 to apply the output voltage to the windings of the SPM motor 32 and to supply the alternating current (AC) power to the SPM motor 32.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A method for controlling a surface-mounted permanent magnet (SPM) motor, the method comprising:
   determining a peak torque value;
   determining a limited torque command based on a torque command and which does not exceed the peak torque value;
   determining, based on the limited torque command, a voltage command; and
   commanding, based on the voltage command, an inverter to apply an output voltage to the SPM motor,
   wherein determining the peak torque value includes:
      determining a voltage angle of the output voltage relative to a q-axis; and calculating the peak torque value based on the voltage angle of the output voltage and based on an available voltage to an input of the inverter.

2. The method of claim 1, wherein determining the voltage angle of the output voltage includes determining the voltage angle based on an electrical speed, an inductance, and a resistance of the SPM motor.

3. The method of claim 2, wherein determining the voltage angle of the output voltage includes computing the voltage angle in accordance with:

$$\delta = \tan^{-1}\left(\frac{\omega_e L}{R}\right),$$

where $\delta$ is the voltage angle, $\omega_e$ is the electrical speed, L is the inductance, and R is the resistance of the SPM motor.

4. The method of claim 1, wherein determining the peak torque value includes calculating the peak torque value in accordance with:

$$\tau_e = \frac{2K_E}{\sqrt{3}} \frac{V_{Avl}(\cos\delta)R - K_e\omega_m R + \omega_e V_{Avl}(\sin\delta)L}{R^2 + \omega_e^2 L^2},$$

where $\tau_e$ is the peak torque value, $K_e$ is a back EMF constant, $V_{Avl}$ is the available voltage to the input of the inverter, $\delta$ is the voltage angle, $\omega_m$ is a mechanical speed, $\omega_e$ is an electrical speed, L is an inductance, and R is a resistance of the SPM motor.

5. The method of claim 1, wherein determining the voltage angle of the output voltage relative to the q-axis includes determining the voltage angle further based on a sign of the torque command.

6. The method of claim 5, wherein determining the voltage angle of the output voltage includes computing the voltage angle of the output voltage in accordance with:

$$s = \tan^{-1}\left(\frac{\text{sign}(\tau_{cmd})\omega_e L}{\text{sign}(\tau_{cmd})R}\right),$$

where $\delta$ is the voltage angle, $\tau_{cmd}$ is the torque command, $\omega_e$ is an electrical speed, L is an inductance, and R is a resistance of the SPM motor.

7. The method of claim 1, further comprising determining a current command based on the voltage angle of the output voltage and based on an available voltage to the input of the inverter, and wherein determining the voltage command includes determining the voltage command further based on the current command.

8. The method of claim 7, wherein determining the current command includes computing the current command in accordance with:

$$\begin{bmatrix} I_d \\ I_q \end{bmatrix} =$$

$$\frac{2}{\sqrt{3}} \frac{1}{R^2 + \omega_e^2 L^2}\left[V_{Avl}\begin{bmatrix} R & -\omega_e L \\ \omega_e L & R \end{bmatrix}\begin{bmatrix} \sin\left(\tan^{-1}\left(\frac{\omega_e L}{R}\right)\right) \\ \cos\left(\tan^{-1}\left(\frac{\omega_e L}{R}\right)\right) \end{bmatrix} + \begin{bmatrix} \omega_e L \\ -R \end{bmatrix}K_e\omega_m\right],$$

where the voltage angle of the output voltage is equal to $$\tan^{-1}\left(\frac{\omega_e L}{R}\right),$$

and where $I_d$ is d-axis current, $I_q$ is q-axis current, $V_{Avl}$ is the available voltage to the input of the inverter, and R, L, $K_e$, $\omega_m$, and $\omega_e$ are resistance, inductance, back EMF constant, mechanical speed, and electrical speed of the SPM motor, respectively.

9. The method of claim 7, wherein determining the current command includes computing the current command in accordance with:

$$\begin{bmatrix} I_d \\ I_q \end{bmatrix} = \frac{2}{\sqrt{3}} \frac{1}{R^2 + \omega_e^2 L^2}\left[V_{Avl}\begin{bmatrix} R & -\omega_e L \\ \omega_e L & R \end{bmatrix}\right.$$

$$\left.\begin{bmatrix} \sin\left(\tan^{-1}\left(\frac{\text{sign}(\tau_{cmd})\omega_e L}{\text{sign}(\tau_{cmd})R}\right)\right) \\ \cos\left(\tan^{-1}\left(\frac{\text{sign}(\tau_{cmd})\omega_e L}{\text{sign}(\tau_{cmd})R}\right)\right) \end{bmatrix} + \begin{bmatrix} \omega_e L \\ -R \end{bmatrix}K_e\omega_m\right],$$

where $I_d$ is d-axis current, $I_q$ is q-axis current, $V_{Avl}$ is the available voltage to the input of the inverter, $\tau_{cmd}$ is the torque command, and R, L, $K_e$, $\omega_m$, and $\omega_e$ are resistance, inductance, back EMF constant, mechanical speed, and electrical speed of the SPM motor, respectively.

10. An electronic controller comprising:

a processor; and a memory that includes instructions that, when executed by the processor, cause the processor to:

determine, a peak torque value;

determine a limited torque command based on a torque command and which does not exceed the peak torque value;

determine, based on the limited torque command, a voltage command; and command, based on the voltage command, an inverter to apply an output voltage to a surface-mounted permanent magnet (SPM) motor, wherein determining the peak torque value includes:

determining a voltage angle of the output voltage relative to a q-axis; and calculating the peak torque value based on the voltage angle of the output voltage and based on an available voltage to an input of the inverter.

11. The electronic controller of claim 10, wherein determining the voltage angle of the output voltage includes determining the voltage angle based on an electrical speed, an inductance, and a resistance of the SPM motor.

12. The electronic controller of claim 11, wherein determining the voltage angle of the output voltage includes computing the voltage angle in accordance with:

$$\delta = \tan^{-1}\left(\frac{\omega_e L}{R}\right),$$

where $\delta$ is the voltage angle, $\omega_e$ is the electrical speed, L is the inductance, and R is the resistance of the SPM motor.

13. The electronic controller of claim 10, wherein determining the peak torque value includes calculating the peak torque value in accordance with:

$$\tau_e = \frac{2K_e}{\sqrt{3}} \frac{V_{Avl}(\cos\delta)R - K_e\omega_m R + \omega_e V_{Avl}(\sin\delta)L}{R^2 + \omega_e^2 L^2},$$

where $\tau_e$ is the peak torque value, $K_e$ is a back EMF constant, $V_{Avl}$ is the available voltage to the input of the inverter, $\delta$ is the voltage angle, $\omega_m$ is a mechanical speed, $\omega_e$ is an electrical speed, L is an inductance, and R is a resistance of the SPM motor.

14. The electronic controller of claim 10, wherein determining the voltage angle of the output voltage relative to the q-axis includes determining the voltage angle further based on a sign of the torque command.

15. The electronic controller of claim 14, wherein determining the voltage angle of the output voltage includes computing the voltage angle of the output voltage in accordance with:

$$s = \tan^{-1}\left(\frac{\text{sign}(\tau_{cmd})\omega_e L}{\text{sign}(\tau_{cmd})R}\right),$$

where $\delta$ is the voltage angle, $\tau_{cmd}$ is the torque command, $\omega_e$ is an electrical speed, L is an inductance, and R is a resistance of the SPM motor.

16. The electronic controller of claim 10, wherein the instructions further cause the processor to determine a current command based on the voltage angle of the output voltage and based on an available voltage to the input of the inverter, and wherein determining the voltage command includes determining the voltage command further based on the current command.

17. The electronic controller of claim 16, wherein determining the current command includes computing the current command in accordance with:

$$\begin{bmatrix} I_d \\ I_q \end{bmatrix} =$$

$$\frac{2}{\sqrt{3}} \frac{1}{R^2 + \omega_e^2 L^2}\left[V_{Avl}\begin{bmatrix} R & -\omega_e L \\ \omega_e L & R \end{bmatrix}\begin{bmatrix} \sin\left(\tan^{-1}\left(\frac{\omega_e L}{R}\right)\right) \\ \cos\left(\tan^{-1}\left(\frac{\omega_e L}{R}\right)\right) \end{bmatrix} + \begin{bmatrix} \omega_e L \\ -R \end{bmatrix}K_e\omega_m\right],$$

where the voltage angle of the output voltage is equal to $$\tan^{-1}\left(\frac{\omega_e L}{R}\right).$$

and where $I_d$ is d-axis current, $I_q$ is q-axis current, $V_{Avl}$ is the available voltage to the input of the inverter, and R, L, $K_e$, $\omega_m$, and $\omega_e$ are resistance, inductance, back EMF constant, mechanical speed, and electrical speed of the SPM motor, respectively.

18. The electronic controller of claim 16, wherein determining the current command includes computing the current command in accordance with:

$$\begin{bmatrix} I_d \\ I_q \end{bmatrix} = \frac{2}{\sqrt{3}} \frac{1}{R^2 + \omega_e^2 L^2}\left[V_{Avl}\begin{bmatrix} R & -\omega_e L \\ \omega_e L & R \end{bmatrix}\right.$$

$$\left.\begin{bmatrix} \sin\left(\tan^{-1}\left(\frac{\text{sign}(\tau_{cmd})\omega_e L}{\text{sign}(\tau_{cmd})R}\right)\right) \\ \cos\left(\tan^{-1}\left(\frac{\text{sign}(\tau_{cmd})\omega_e L}{\text{sign}(\tau_{cmd})R}\right)\right) \end{bmatrix} + \begin{bmatrix} \omega_e L \\ -R \end{bmatrix}K_e\omega_m\right],$$

where $I_d$ is d-axis current, $I_q$ is q-axis current, $V_{Avl}$ is the available voltage to the input of the inverter, $\tau_{cmd}$ is the torque command, and R, L, $K_e$, $\omega_m$, and $\omega_e$ are resistance, inductance, back EMF constant, mechanical speed, and electrical speed of the SPM motor, respectively.

19. A motor control system, comprising:

a surface-mounted permanent magnet (SPM) motor;

an inverter configured to supply an alternating current (AC) power to the SPM motor; and a controller configured to:

determine, a peak torque value;

determine a limited torque command based on a torque command and which does not exceed the peak torque value;

determine, based on the limited torque command, a voltage command; and command, based on the voltage command, the inverter to apply an output voltage to the SPM motor, wherein determining the peak torque value includes:

determining a voltage angle of the output voltage relative to a q-axis; and calculating the peak torque value based on the voltage angle of the output voltage and based on an available voltage to an input of the inverter.

20. The motor control system of claim 19, wherein determining the voltage angle of the output voltage includes determining the voltage angle based on an electrical speed, an inductance, and a resistance of the SPM motor.

\* \* \* \* \*